(12) United States Patent
Archer et al.

(10) Patent No.: US 7,320,639 B2
(45) Date of Patent: Jan. 22, 2008

(54) LID TO LOWER BASKET SEALING APPARATUS FOR A COTTON PACKAGER MACHINE

(75) Inventors: Tracy R. Archer, West Liberty, IA (US); Michael J. Covington, Bettendorf, IA (US); Timothy A. Meeks, Davenport, IA (US)

(73) Assignee: CNH America LLC, New Holland, PA (US)

( * ) Notice: Subject to any disclaimer, the term of this patent is extended or adjusted under 35 U.S.C. 154(b) by 240 days.

(21) Appl. No.: 11/095,170

(22) Filed: Mar. 31, 2005

(65) Prior Publication Data

US 2006/0218888 A1    Oct. 5, 2006

(51) Int. Cl.
*A01F 12/60*    (2006.01)

(52) U.S. Cl. ............................ 460/119; 56/28; 100/214

(58) Field of Classification Search ................. 56/16.6; 460/23, 119; 296/26.01, 26.02, 26.04, 26.05; 100/61, 214, 240, 245
See application file for complete search history.

(56) References Cited

U.S. PATENT DOCUMENTS

| | | | |
|---|---|---|---|
| 1,052,385 A | 2/1913 | Shepard | |
| 1,473,925 A | 11/1923 | Dryer | |
| 1,773,529 A | 8/1930 | Gilmore | |
| 2,365,240 A | 12/1944 | Arnold | 214/17 |
| 2,511,873 A | 6/1950 | Perkins | 29/148.2 |
| 3,744,228 A | 7/1973 | Lundahl | 56/344 |
| 3,809,269 A | 5/1974 | Lundahl | 214/519 |
| 3,845,608 A | 11/1974 | Lueshen | 56/13.3 |
| 3,918,502 A | 11/1975 | Kline | 150/1 |
| 4,519,189 A | 5/1985 | Fachini et al. | 56/16.6 |
| 5,427,572 A | 6/1995 | Deutsch et al. | 460/119 |
| 5,673,779 A | 10/1997 | Spickelmire | 193/6 |
| 5,697,408 A | 12/1997 | Reeves | 141/284 |
| 5,878,558 A * | 3/1999 | Fox et al. | 56/14.7 |
| 6,409,456 B1* | 6/2002 | Horejsi et al. | 414/495 |
| 6,692,352 B2* | 2/2004 | Gerber et al. | 460/119 |

* cited by examiner

*Primary Examiner*—Thomas B. Will
*Assistant Examiner*—Mai T Nguyen
(74) *Attorney, Agent, or Firm*—Michael G. Harms; John William Stader; Patrick M. Sheldrake

(57) ABSTRACT

A cotton receiving basket for an on-board cotton harvesting machine including a lower basket having a plurality of upwardly extending walls having upper portions including elongate upper seal elements extending therealong, respectively; a basket lid having a plurality of downwardly extending walls having lower portions including elongate lower seal elements extending therealong, respectively, and the lower basket and the basket lid being telescopically related so as to be movable one relative to the other between a telescopically retracted position and a telescopically extended position, and wherein the upper and lower seal elements have oppositely facing tapered seal surfaces, respectively, which are cooperatively engaged along substantially the lengths thereof forming substantially sealed conditions therebetween when the lower basket and the basket lid are in the telescopically extended position.

16 Claims, 4 Drawing Sheets

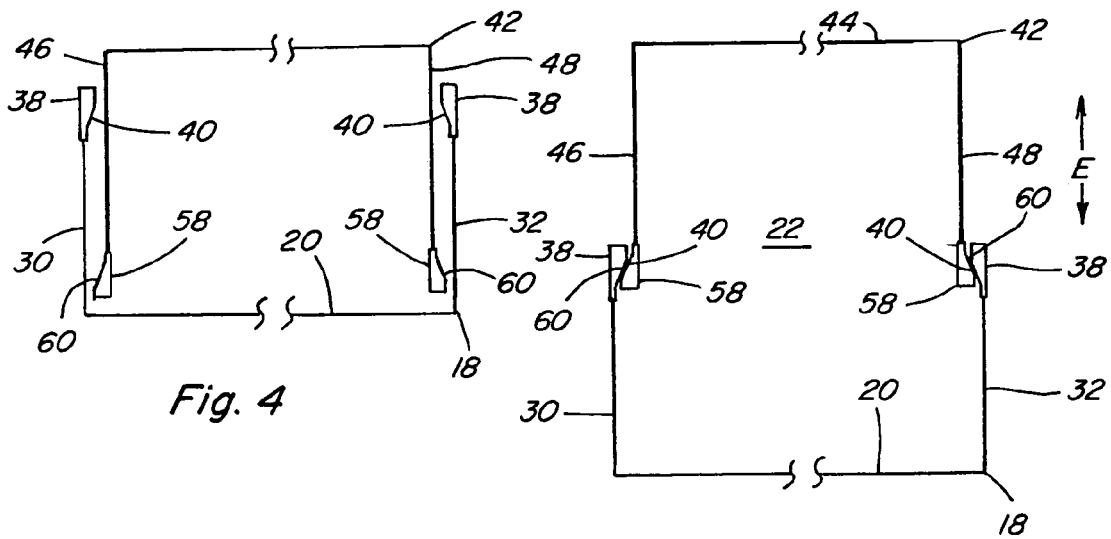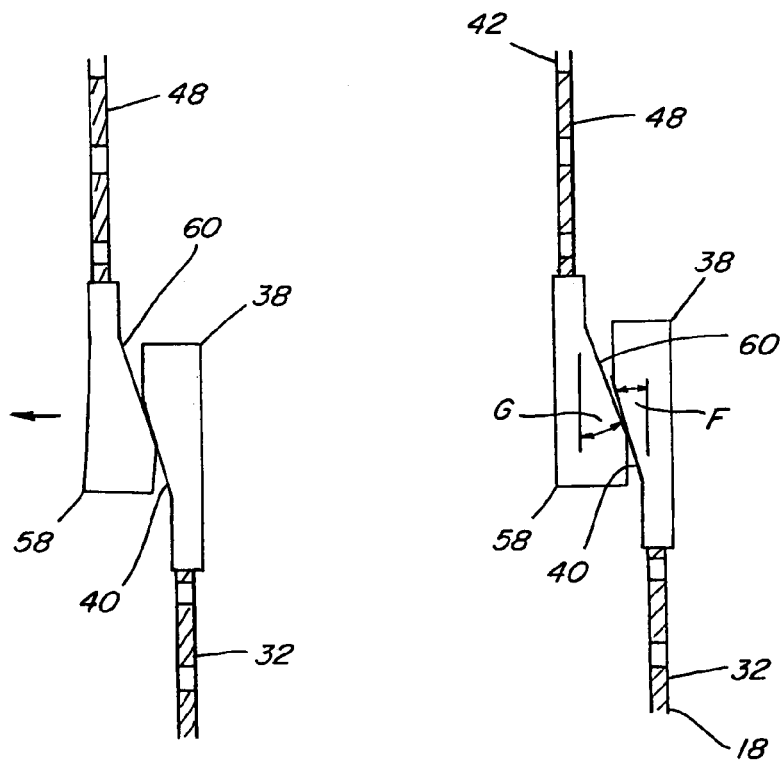

LID TO LOWER BASKET SEALING APPARATUS FOR A COTTON PACKAGER MACHINE

TECHNICAL FIELD

This invention relates generally to a telescoping basket for a cotton packager, and more particularly, to a sealing apparatus for an interface between a telescoping basket lid and lower basket, for limiting escape of cotton therebetween.

BACKGROUND ART

Commonly, telescoping basket arrangements are utilized for on-board packagers and module builders of cotton harvesting machines. The telescoping capability of such baskets is advantageous as it allows the basket to be collapsed to a lower overall height for compliance with height restrictions for travel over public roads, for passage under bridges and through doorways, and the like. Telescopically extending the basket lid upwardly from the lower basket provides increased capacity for receiving and holding cotton in the basket. As a result of the telescoping nature of the basket arrangement, an interface will exist between the upper edge portions of the upwardly extending walls of the lower basket and the lower edge portions of the downwardly extending walls of the basket lid, which may provide a passage for cotton to escape from the interior of the basket. For applications wherein the cotton is to be densely compacted by compactor apparatus located within the basket, cotton can be forced by the compacting action of the compactor apparatus through the interface if not suitably sealed, so as to escape the basket and hang from the exterior detached from the cotton inside, or so as to be lost.

As a result, it is desirable to provide an effective seal at the interface between the basket lid and lower basket, which is reliably engaged when the lid and lower basket are telescopically extended, to limit or prevent passage of cotton therebetween, and which is reliably released and does not become snagged and/or damaged during telescoping movement of the lid and lower basket. Still further, it is optionally desirable for the seal to facilitate telescoping movement of the basket lid and lower basket between the extended and retracted positions.

Commonly, flexible rubbery seals are used to form sealed conditions between telescopically related members for a variety of applications. However, such flexible seals can stiffen and tear or otherwise be damaged from use. In the present instance, the basket walls of a cotton packager are typically constructed of perforated metal or screen, which can abrade or otherwise damage flexible rubbery seals when moved thereover.

Thus, what is sought is a sealing arrangement for the lid to lower basket interface of a telescoping basket arrangement, which provides one or more of the capabilities and overcomes one or more of the problems and shortcomings set forth above.

SUMMARY OF THE INVENTION

According to a preferred aspect of the invention, a seal apparatus for a telescoping cotton receiving basket for a cotton packager machine, which provides many of the advantages and overcomes one or more of the problems set forth above, is disclosed.

The basket includes a lower basket having a plurality of elongate, upwardly extending walls having upper edge portions extending therealong. A basket lid has a plurality of downwardly extending walls having elongate lower edge portions extending therealong. Typically, the edge portions extend horizontally, or near horizontally. The lower basket and the basket lid are telescopically related so as to be movable one relative to the other between a telescopically retracted position wherein an interior volume thereof is reduced, and a telescopically extended position, wherein the interior volume is enlarged. Typically, it is the basket lid which moves telescopically relative to the lower basket. The basket lid can be telescopically received in the lower basket, or the lower basket can be telescopically received in the basket lid.

According to a preferred aspect of the invention, the seal apparatus comprises elongate rigid seal elements incorporated into and/or comprising the upper and lower edges of the lower basket and the basket lid, and extending substantially the lengths thereof, such that when the lower basket and the lid are in the telescopically extended position, the rigid seal elements are cooperatively engaged along at least substantially the lengths thereof, forming a substantially sealed condition, for substantially limiting or preventing escape of cotton at the interface of the lower basket and the lid.

According to another preferred aspect of the invention, the seal elements include oppositely facing tapered surfaces which are slidingly engageable as the lower basket and the basket lid are relatively telescopically moved to the extended position. According to another preferred embodiment, at least one of the pairs of telescopically related walls of the lower basket and the basket lid is resiliently yieldable, such that, as the lower basket and the lid are telescopically moved one relative to the other toward or in the extended position, a resilient biasing force is exerted between the engaged seal elements, thereby improving the sealed condition.

According to still another preferred aspect of the invention, one or both of the surfaces of the upper and lower seal elements can be of a low friction material, such as a low friction polymer material, such as but not limited to, a high density polyethylene, an ultrahigh molecular weight polyethylene, or a similar low friction plastic material preferably having a coefficient of friction within a range of from about 0.1 to about 0.3, for facilitating sliding and sealing engagement between the surfaces.

BRIEF DESCRIPTION OF THE DRAWINGS

FIG. 3 is a simplified schematic sectional representation of the packager of FIG. 1, with the lower basket and basket lid in a telescopically extended position one relative to the other to engage seal elements thereof;

FIG. 4 is a simplified schematic sectional representation of the packager of FIG. 1, with the lower basket and basket lid in a telescopically retracted position one relative to the other;

FIG. 5 is an enlarged end view of walls of the lower basket and basket lid with opposing surfaces of the seal elements thereof cooperatively engaged forming a sealed condition therebetween;

FIG. 6 is another enlarged end view of walls of the lower basket and basket lid with opposing surfaces of the seal elements thereof cooperatively engaged forming a sealed condition therebetween;

DETAILED DESCRIPTION OF THE INVENTION

Figure 1:
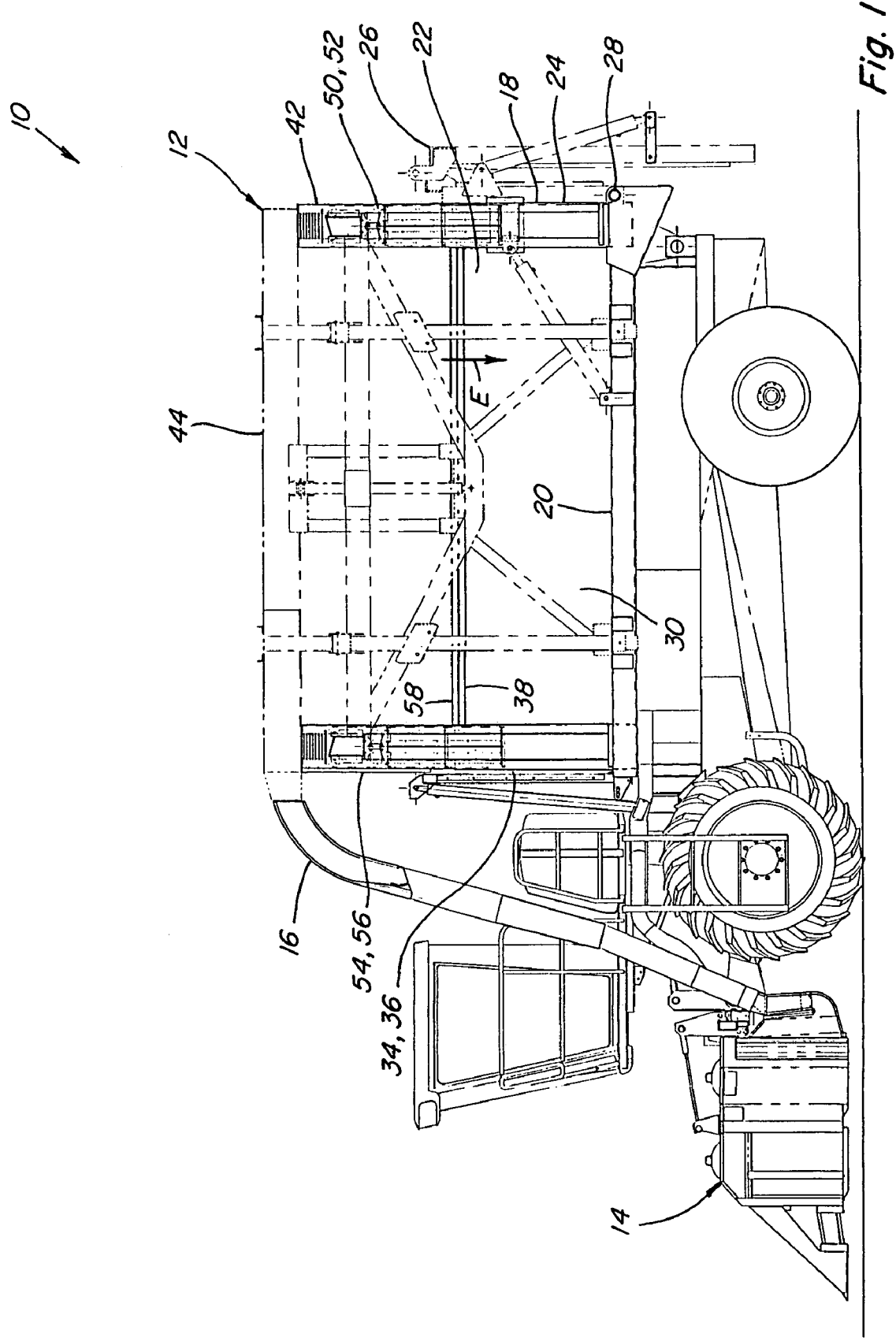
FIG. 1 is a side view of a cotton harvesting machine having an on-board cotton packager including a basket lid to lower basket sealing apparatus of the invention.

A cotton harvesting machine 10 is shown, including a cotton packager 12 for receiving and holding cotton harvested by a plurality of picker units 14 arrayed across a forward end of machine 10. The cotton is conveyed from picker units 14 through a plurality of parallel ducts 16 by air flows through the ducts, which air flows are dissipated through walls of packager 12, as will be explained.

Cotton packager 12 includes a lower basket 18 including a floor 20 defining a lower region of a cotton compacting chamber 22. Compacting chamber 22 includes a first end 24 enclosable by an unloader door 26 pivotally mounted at a pivot 28 for movement between a closed position as shown, and an open position wherein the door is substantially parallel to floor 20.

Figure 2:
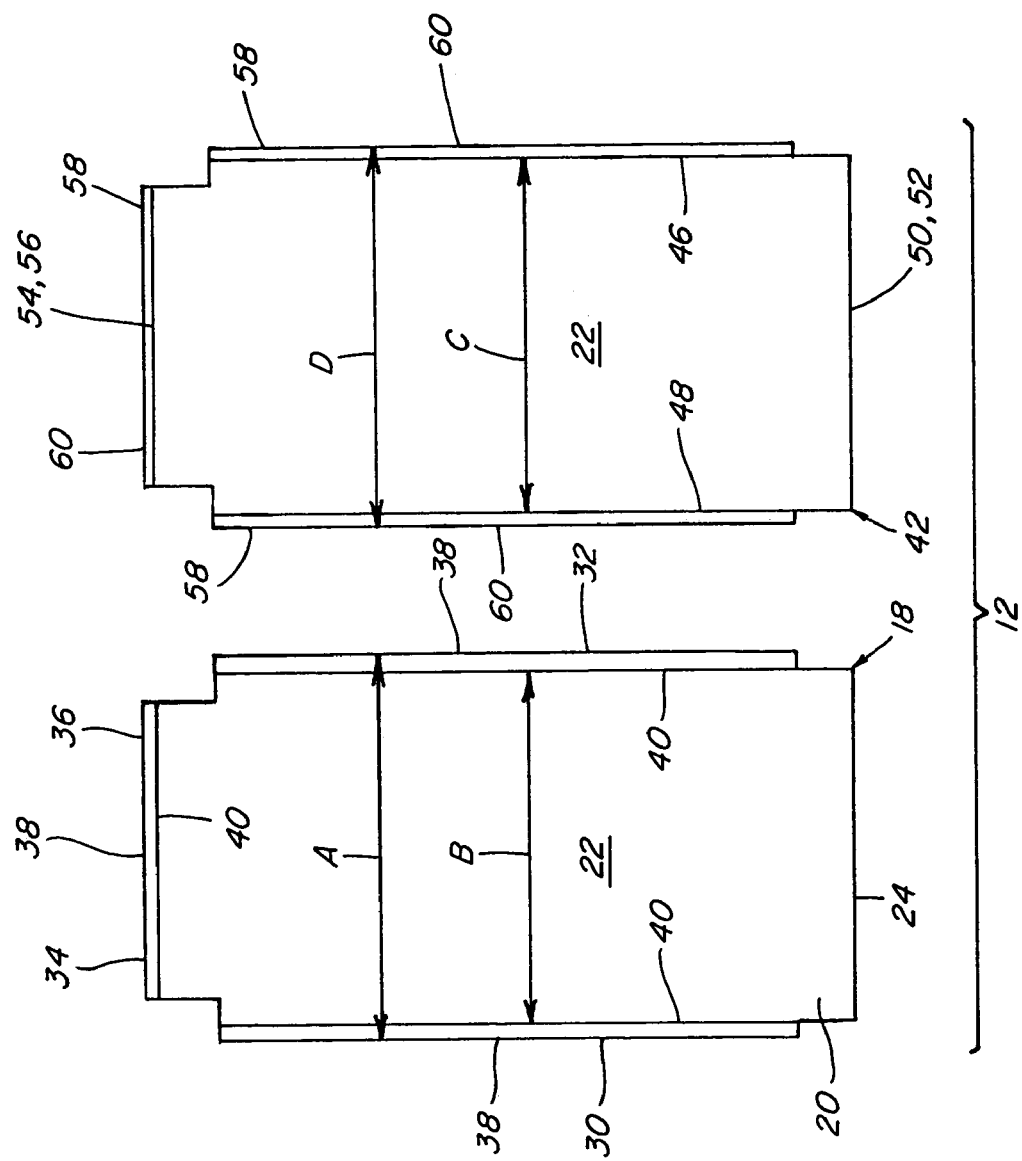
FIG. 2 is a simplified schematic representation looking downwardly into the lower basket and upwardly into the basket lid of the cotton packager of FIG. 1.

Referring also to FIGS. 2, 3 and 4, lower basket 18 includes a pair of upstanding, opposing side walls 30 and 32 on opposite sides of compacting chamber 22 extending between first end 24 and an opposite second end 34 which is enclosed by an upstanding end wall 36. Side walls 30 and 32 are not connected to end wall 36, and the corners of lower basket 18 include other elements for limiting passage of cotton from chamber 22 at those locations. Side walls 30 and 32, and end wall 36, each have an upper end including an elongate rigid upper seal element 38 of the invention extending along at least substantially the entire horizontal extent or length thereof. Each elongate rigid upper seal element 38 has a seal surface 40 extending at least substantially the length thereof which faces inwardly, toward chamber 22. Side walls 30 and 32, are a predetermined distance apart, denoted by distance A in FIG. 2. Sidewardly innermost edges of opposing seal surfaces 40 of elongate rigid seal elements 38 of side walls 30 and 32 are a second predetermined distance apart, denoted by distance B in FIG. 2, distance B being marginally smaller than distance A.

Packager 12 includes a basket lid 42 including a roof 44 defining an upper region of chamber 22. Lid 42 includes a pair of opposing side walls 46 and 48 extending downwardly from roof 44 on opposite sides of the upper region of compacting chamber 22. Basket lid 42 has a first end 50 at least partially enclosed by an end wall 52 which will cooperate with unloader door 26 for forming a suitable seal for limiting escape of cotton therebetween. Lid 42 has an opposite second end 54 enclosed by an end wall 56. Side walls 46 and 48, and end wall 56, each extend downwardly to a lower end or edge including an elongate rigid lower seal element 58 extending at least substantially the length thereof, each lower seal element 58 including a seal surface 60 extending at least substantially the length thereof, which faces outwardly, away from chamber 22. Side walls 46 and 48 are a predetermined distance apart, denoted by distance C, which is less than both distances A and B. Opposite innermost edges of surfaces 60 of seal elements 58 of side walls 46 and 48 are a predetermined distance D apart. Distance D is greater than distances C and B, but is marginally less than distance A. As a result, the lower ends of walls 46, 48 and 52 of basket lid 42 are telescopically receivable in lower basket 18, such that lower basket 18 and lid 42 are relatively telescopically movable between a telescopically retracted position as shown in FIG. 4, and a telescopically extended position as shown in FIGS. 1 and 3, and surfaces 40 and 60 are cooperatively engageable when lower basket 18 and lid 42 are in the telescopically extended position. Lower basket 18 is preferably fixedly mounted on harvesting machine 10, and suitable apparatus (not shown) is provided for telescopically moving basket lid 42 upwardly and downwardly, denoted by arrows E, between the telescopically retracted position (FIG. 4), and the telescopically extended or raised position (FIGS. 1, 3 and 5).

As best illustrated in FIGS. 3 and 5, more particularly when in the telescopically extended position, lower seal elements 58 of side walls 46 and 48, and end wall 52, are cooperatively engaged with upper seal elements 38 of side walls 30 and 32 and end wall 36, respectively, along substantially the lengths thereof, forming a sealed condition therebetween sufficient to at least substantially limit passage of cotton therebetween. Preferably, seal surfaces 40 of upper seal elements 38 are tapered or angled so as to extend in an upward and inward direction from the wall 30, 32 or 36 relative to chamber 22, and opposing seal surfaces 60 of lower seal elements 58 are tapered or angled so as to extend in a downward and outward direction from wall 46, 48 or 56, at intersecting angles for cooperatively engaging when lower basket 18 and lid 42 are in the telescopically extended position. In this regard, seal surfaces 40 can be at about a 15 degree angle, denoted by angle F in FIG. 5, relative to a plane or surface of the wall that the seal element is located on such as wall 32, and surfaces 60 can be at about a 20 degree angle, denoted by angle G, relative to a wall such as wall 48 on which the seal element is located, such that surfaces 40 and 60 can be brought together in edge to surface relation, forming a sealed condition longitudinally thereal-ong. Here, its should be recognized that other intersecting angles for surface 40 and 60 can be utilized, or the surfaces can be parallel, as desired or required for a particular application. It should also be recognized that the opposing tapered surfaces 40 and 60 allow some vertical misalignment of the cooperatively engaged seal elements 38 and 58, while still enabling a sealed condition to be formed along substantially the entire lengths thereof.

At least surfaces 40 and 60 of seal elements 38 and 58 are preferably of a substantially rigid material, such as metal, hard plastics, or the like. Optionally, one or both of surfaces 40 and 60 can comprise a low friction material, such as a low friction polymer, such as, but not limited to, a high density polyethylene, an ultrahigh molecular weight polyethylene, or a similar low friction plastic material preferably having a coefficient of friction within a range of from about 0.1 to about 0.3, to facilitate some relative sliding engaged movement between the surfaces, for instance, for achieving a more complete sealed condition when the lower basket 18 and lid 42 are not precisely aligned.

Referring also to FIG. 6, one or more walls of lower basket 18 and/or basket lid 42 can be resiliently yieldable, and the distances that the opposing walls thereof are apart can be set, such that one or more of the walls will be resiliently deflected, as illustrated by the slight deflection of side wall 48, denoted by the small arrow, relative to side wall 32, to provide enhanced engagement between surfaces 40 and 60 of seal elements 38 and 58.

Figure 7:
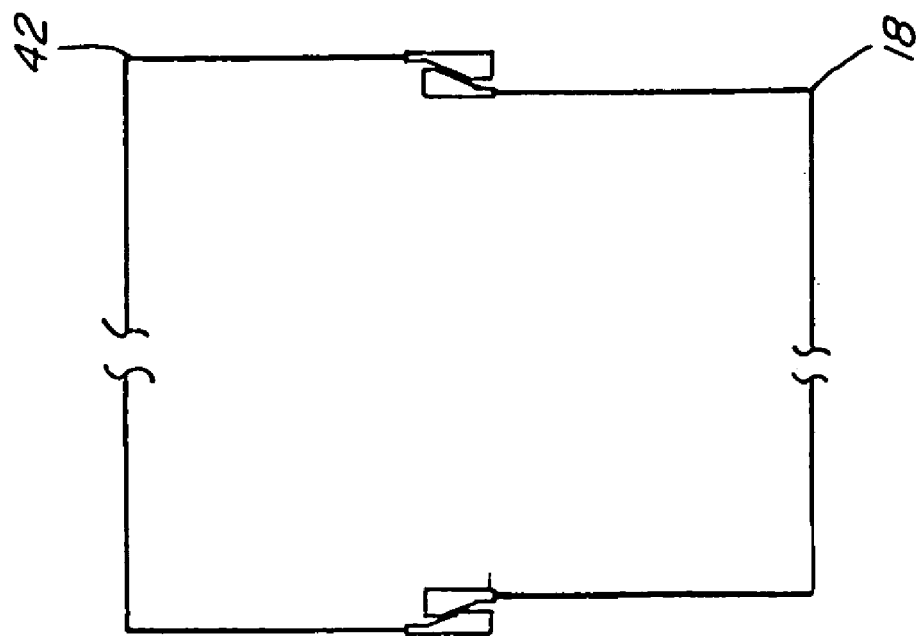
FIG. 7 is a simplified schematic sectional representation of an alternative embodiment of the packager of FIG. 1, with the lower basket and basket lid in a telescopically extended position one relative to the other.
Figure 8:
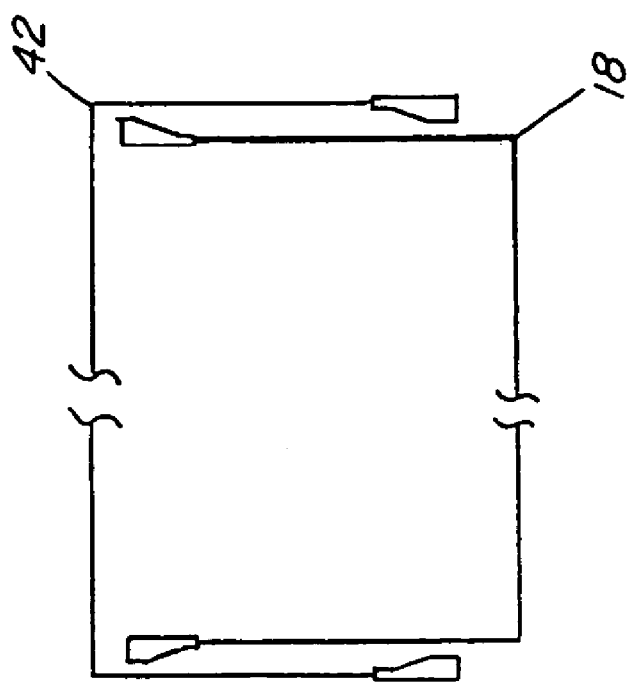
FIG. 8 is a simplified schematic sectional representation of the packager of FIG. 7, with the lower basket and basket lid in a telescopically retracted position one relative to the other.

Referring also to FIGS. 7 and 8, it should be noted that, as an alternative construction, lower basket 18 can be telescopically received in basket lid 42, while providing the same sealing effect set forth above.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A cotton receiving basket for an on-board cotton harvesting machine, comprising:
a lower basket having a plurality of upwardly extending walls having upper portions including elongate upper seal elements extending therealong, respectively;
a basket lid having a plurality of downwardly extending walls having lower portions including elongate lower seal elements extending therealong, respectively; and
the lower basket and the basket lid being telescopically related so as to be movable one relative to the other between a telescopically retracted position and a telescopically extended position, and wherein the upper and lower seal elements have oppositely facing tapered upper and lower seal surfaces, respectively, the upper and lower seal surfaces are cooperatively slidably engageable along substantially the lengths thereof forming substantially sealed conditions therebetween when the lower basket and the basket lid are in the telescopically extended position, wherein the upper seal surface is angled in an upward and inward direction from the upwardly extending walls, further wherein the lower seal surface is angled in a downward and outward direction from the downwardly extending walls.

2. The cotton receiving basket of claim 1, wherein the oppositely facing tapered upper and lower seal surfaces are oriented at different angles so as to be intersecting.

3. The cotton receiving basket of claim 1, wherein the tapered seal surfaces of at least one of the upper and lower seal elements comprise a low friction polymer material.

4. The cotton receiving basket of claim 3, wherein the low friction polymer material is selected from a group consisting of a high density polyethylene and an ultrahigh molecular weight polyethylene.

5. The cotton receiving basket of claim 1, wherein at least one wall of the lower basket or the basket lid is resiliently yieldable, for applying a resilient biasing force against the seal surfaces when cooperatively engaged.

6. The cotton receiving basket of claim 1, wherein the walls of the basket lid are telescopically received within a chamber defined by the walls of the lower basket.

7. A cotton receiving basket for an on-board cotton harvesting machine, comprising:
a lower basket having a plurality of upwardly extending walls having elongate upper seal elements extending along upper peripheral edges thereof, each of the upper seal elements having a tapered upper seal surface extending longitudinally therealong, wherein the upper seal surface is angled in an upward and outward direction from the upwardly extending walls;
a basket lid having a plurality of downwardly extending walls having lower peripheral edge portions having elongate lower seal elements extending therealong, each of the lower seal elements having a tapered lower seal surface extending longitudinally therealong, wherein the lower seal surface is angled in a downward and inward direction from the downwardly extending walls; and
the lower basket and the basket lid being telescopically related so as to be movable one relative to the other between a telescopically retracted position and a telescopically extended position, and wherein the upper seal surface is in opposing relation to the lower seal surface, and wherein the upper and lower seal surfaces are brought into cooperative slidable engagement along substantially the lengths thereof when the lower basket and the basket lid are brought into the telescopically extended position, forming a substantially sealed condition between the lower basket and the basket lid.

8. The cotton receiving basket of claim 7, wherein at least one of the seal surfaces of the upper seal elements and the lower seal elements comprise a rigid material.

9. The cotton receiving basket of claim 7, wherein the seal surfaces are rigid.

10. The cotton receiving basket of claim 7, wherein at least one of the seal surfaces of the upper seal elements and the lower seal elements comprise a low friction polymer material.

11. The cotton receiving basket of claim 7, wherein the upper and lower seal surfaces are oriented at intersecting angles.

12. The cotton receiving basket of claim 7, wherein the upwardly extending walls of the lower basket are cooperatively received in a chamber defined by the downwardly extending walls of the basket lid.

13. A cotton receiving basket for an on-board cotton harvesting machine, comprising:
a lower basket having a plurality of upwardly extending walls having elongate upper seal elements extending therealong, each of the upper seal elements having a rigid tapered upper seal surface extending longitudinally therealong, wherein the upper seal surface is angled in an upward and inward direction from the upwardly extending walls, the walls of the lower basket defining a lower region of a cotton compacting chamber; and
a basket lid having a plurality of downwardly extending walls having elongate lower seal elements extending therealong, each of the lower seal elements having a rigid tapered lower seal surface extending longitudinally therealong, wherein the lower seal surface is angled in a downward and outward direction from the downwardly extending walls, the walls of the basket lid being telescopically received in the chamber defined by the walls of the lower basket for telescoping movement between a retracted position wherein the basket lid is received in the lower basket and an extended position wherein the basket lid extends from the lower basket and the upper and lower seal surfaces are cooperatively slidably engageable along substantially the lengths thereof, to form a sealed condition therebetween.

14. The cotton receiving basket of claim 13, wherein at least one of the seal surfaces comprise a low friction polymer material.

15. The cotton receiving basket of claim 13, wherein at least one of the walls is resiliently yieldable.

16. The cotton receiving basket of claim 13, wherein the upper and lower seal elements surfaces are oriented at different angles, so as to extend intersectingly in an upward and downward direction.

* * * * *